United States Patent [19]

Griswold

[11] Patent Number: 4,603,798
[45] Date of Patent: Aug. 5, 1986

[54] CAR TOP CARRIER

[76] Inventor: Wayne D. Griswold, 914 Screenland Dr., Burbank, Calif. 91505

[21] Appl. No.: 529,047

[22] Filed: Sep. 2, 1983

[51] Int. Cl.⁴ .............................................. B60P 3/10
[52] U.S. Cl. ........................... 224/310; 224/42.03 A; 224/922; 296/37.6; 414/462
[58] Field of Search ............... 224/310, 311, 273, 317, 224/324, 322, 280, 282, 42.03 A; 414/462; 248/503; 280/414.1, 414.2, 414.3; 296/37.6, 37.7

[56] References Cited

U.S. PATENT DOCUMENTS

| | | | |
|---|---|---|---|
| 2,895,628 | 7/1959 | Gebhart | 224/42.03 R |
| 3,301,421 | 1/1967 | Lutters | 414/462 |
| 3,311,246 | 3/1967 | Jones, Sr. | 414/462 |
| 3,608,758 | 9/1971 | Dolbin | 414/462 |
| 3,628,677 | 12/1971 | Cislaw | 414/462 |
| 3,709,413 | 1/1973 | Nelson | 224/310 |
| 4,046,273 | 9/1977 | Hughes | 414/462 |
| 4,085,859 | 4/1978 | Petron | 224/310 X |
| 4,087,029 | 5/1978 | Shoemaker | 224/310 |
| 4,088,365 | 5/1978 | Johnson | 296/37.6 |
| 4,216,887 | 8/1980 | Kieffer | 224/310 |
| 4,288,011 | 9/1981 | Grossman | 280/769 X |

FOREIGN PATENT DOCUMENTS 784563  5/1968  Canada .................... 224/318

Primary Examiner—Stephen Marcus
Assistant Examiner—Robert Petrik
Attorney, Agent, or Firm—John E. Wagner

[57] ABSTRACT

An improved car top carrier designed particularly for carrying boats and which allows a single person to both load and unload the boat unassisted while providing secure transportation for the boat. It comprises basically a three point support system including a generally triangular support at the front of the vehicle, for example mounted on the front bumper with an apex at the top, which constitutes a pivot point for both the loading and unloading of the boat. The second two points of support are provided by a cross bar support secured to the top of the vehicle whereby opposite gunwales of the boat are supported and may be secured to the cross bar support. In one embodiment, the cross bar support is a box for carrying long objects such as fishing rods.

6 Claims, 15 Drawing Figures

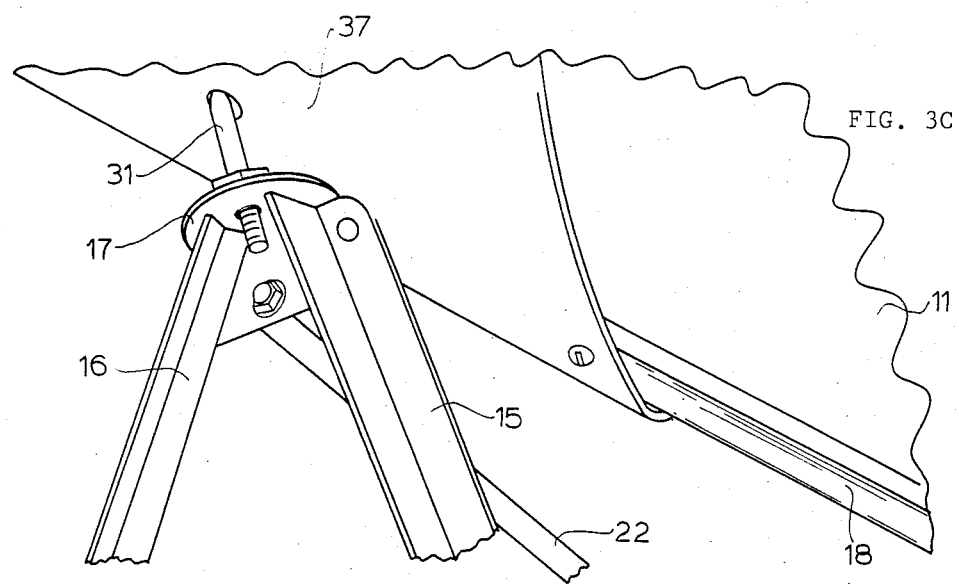
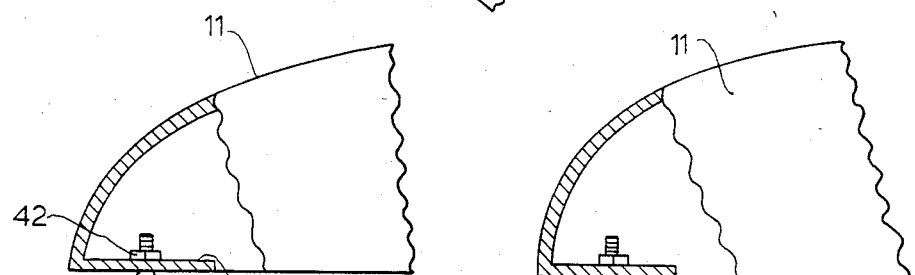
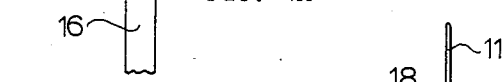
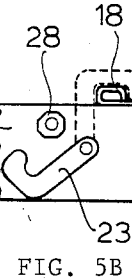
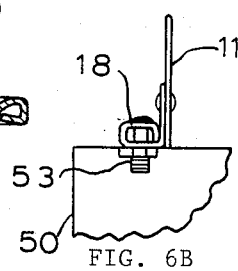
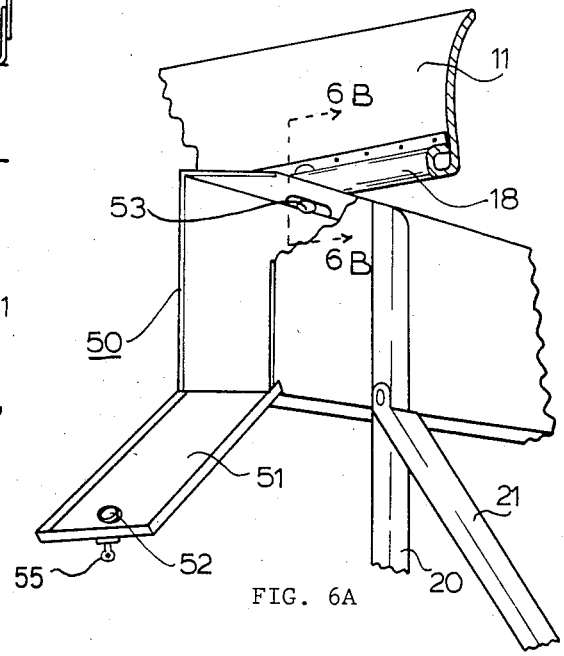

CAR TOP CARRIER

BACKGROUND OF THE INVENTION

There has been a long time need for an improved car top boat carrier. Literally dozens of patents have issued on systems for carrying boats and many have had as objectives simplicity and ease of loading and unloading. Unfortunately, as the need has been recognized for simple boat carriers usable by a single person, their design have become more and more complex rendering them uneconomical, and further not particularly effective.

Examples are the number of car top carriers are as follows:

U.S. Pat. No. 2,600,082, A. H. Sumner, July 10, 1952;
U.S. Pat. No. 2,895,628, L. J. Gebhart, July 21, 1959;
U.S. Pat. No. 3,709,413, R. R. Nelson, Jan. 9, 1973;
U.S. Pat. No. 3,918,669, G. W. Osterhout, Nov. 11, 1975;
U.S. Pat. No. 4,087,029, C. L. Shoemaker, May 2, 1978; and
U.S. Pat. No. 4,216,887, D. L. Keiffer, Aug. 12, 1980.

Given this state of the art and continuing need for a simple carrier I set about to design one which would allow an individual to load and unload a boat weighing as much as 200 pounds unassisted. Of course, an individual cannot lift an entire boat of such weight over his head when mounted on a car or truck top. Many individuals are capable of lifting one end of the boat of such weight but this lifting has to be done with care, and after lifting, it must be received by the vehicle body or some part of the carrier in a manner which does not damage either the vehicle, carrier, or the boat, and which must be secure enough that the boat will not fall during the lifting process. I have learned from experience that a boat, in the loading and unloading process, is quite unstable and there is a real danger of it either falling, or of injury to the person attempting the loading. Neither result is acceptable.

BRIEF DESCRIPTION OF THE INVENTION

Having seen prior art car top carriers for boats and having loaded and unloaded my own boat many times with varying degrees of difficulty, I came to the conclusion that a car top carrier was needed with a definite, secure lift point which could be used during the lifting and removing steps, and also act as a secure point for the boat when it is in transit. I also determined that broad area supports for boats without a positive connection to the boat, encounter the danger of movement of the boat on rapid deceleration of the vehicle, which can result in a catastrophic failure for not only the boat but also the vehicle and occupants. I therefore, set out to invent a three point suspension with at least one of the points secured as by a bolt through a major structural part of the boat to secure it to the car top carrier while in transit.

I have therefore developed a carrier comprising a front support of triangular shape having an apex at approximately the roof level of the vehicle and secured to the front region of the vehicle; and a second carrier having two support points broad enough to encompass the regions of the gunwales of the boat at approximately ⅔ or more of its distance from the bow. The carrier providing the two points is preferably a cross bar carrier held for example to an auto top, or in the case of a pick-up truck, supported by vertical supports secured to the front or middle region of the truck bed side walls.

The front support includes a support plate and a vertically extending tapered rod secured thereto which is designed to engage either a fitting on the bow of a boat to be carried, or to engage a hole in the structural part of the bow region of the boat. The gunwales at an aft position on the boat are secured preferably by clamping devices which provide basic restraint from lateral as well as forward movement of the boat. The bow securement provides both longitudinal and lateral restraint on the bow of the boat.

An alternate form of bow attachment includes a cup like holder which receives a ball fixture on the bow of the boat. Alternate rear securing arrangements include a bolt which penetrates the gunwale of the boat.

The front "A" frame support is secured to the front bumper and to either the hood or grill portion of the vehicle or to the rear support.

An alternate form of rear support is in the form of an elongated box which not only supports and locks the boat in place, but provides storage for fishing poles and the like.

BRIEF DESCRIPTION OF THE DRAWINGS

This invention may be more clearly understood from the following detail description and by reference to the drawings in which:

FIG. 3C is a fragmentary perspective view of a boat being placed on the front support in the step of loading;

FIG. 4A is fragmentary vertical sectional view of an alternate form of bow attachment of this invention;

FIG. 4B is an enlarged vertical section similar to FIG. 4A with the boat secured for transport;

FIG. 5A is a side elevational view of one form of rear attachment;

FIG. 5B is a rear elevational view of the attachment of FIG. 5A with the locked position shown in phantom;

FIG. 6A is a fragmentary perspective view of a rear support assembly including a storage box;

FIG. 6B is a fragmentary vertical sectional view taken along lines 6B—6B of FIG. 6A.

DETAILED DESCRIPTION OF THE INVENTION

Figure 1:
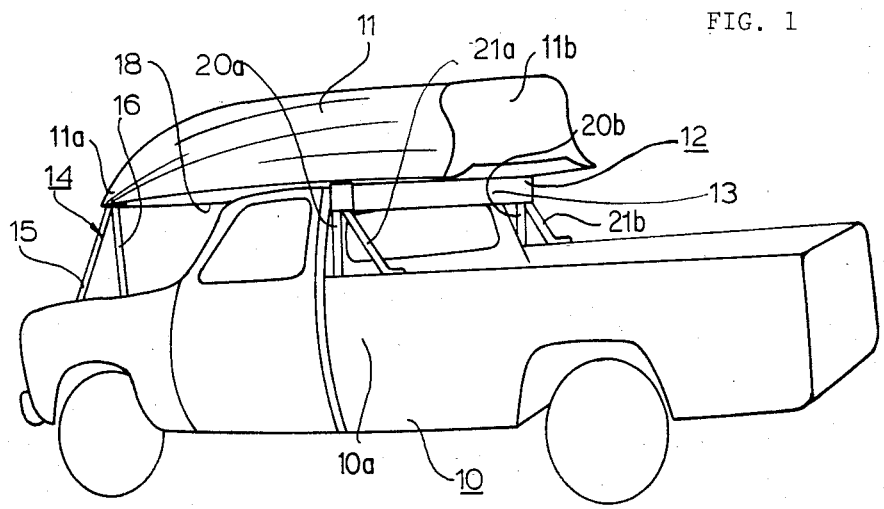
FIG. 1 is a perspective view of a pick-up truck including the carrier of this invention with a boat in place.

For further understanding of this invention, reference is now made to FIG. 1 showing a truck 10 carrying on its top a boat 11 which is supported by a car top carrier generally designated 12 and including a rear support 13 and a front support generally designated 14, the latter comprising a pair of angled members 15 and 16 which form an "A" frame front support. The boat 11 includes a pointed prow 11a supported by the front support 14 on a plate 17 appearing in FIG. 2 and with gunwales 18 which rest upon the cross member 13. The cross member 13 is supported from the bed, or properly the sidewalls 10a of pick-up truck 10 by a pair of vertical support members 20a and 20b each having an angular brace 21a and 21b. The vertical braces 20a and 20b preferably extend through the normal rectangular openings in the side wall 10a of a pick-up truck 10 or may be otherwise secured to the front wall of the pick-up bed region. It should be noted that the transom 11b of the boat 11 extends rearward of the cross support member 13.

As will be described below, the boat 11 is secured at its prow region 11a and its gunwale region 18, the latter to cross member 13 to provide 3-point support for the boat. Both the front support 14 and the cross member 13 are positioned at slightly above the level of the cab roof although the height of the support members 14 and 13 may be variable to an extent desired to provide both clearance of the doors and roof of the cab, and also to avoid interference with the view of the driver.

Figure 2:
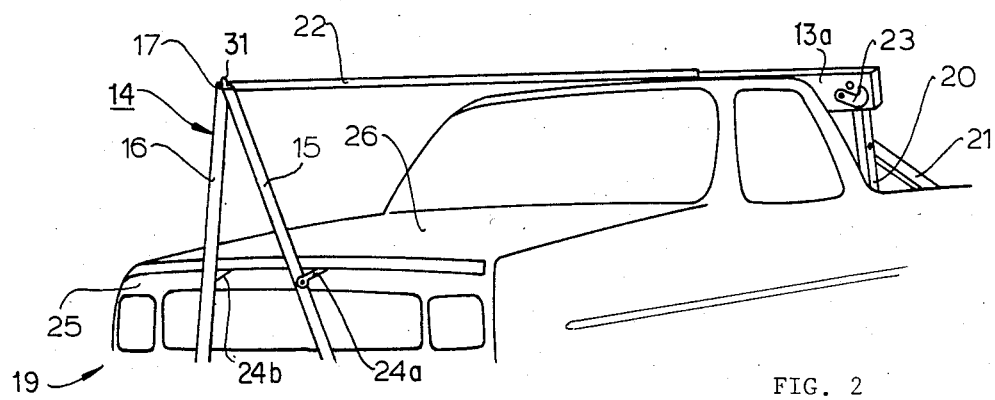
FIG. 2 is a perspective view of the carrier of this invention with a boat removed and showing an alternate form of support assembly.

Certain of the details of the support of FIG. 1 may be seen by referring to FIG. 2 which shows an alternate embodiment of the basic structure. In the embodiment of FIG. 2 the front support 14 including, the "A" frame members 15 and 16, are shown secured to the front bumper of the vehicle 10 as by clamps and includes additional braces 24a and 24b which themselves are secured to the grill 25 of vehicle 10 and to the median region of the respective front support members 15 and 16. With the presence of the braces 24a and 24b the front support is truly an "A" frame.

At the top of the front support 14 on plate 17 is a dual purpose device 31 which acts as a pivot during the mounting and removal of the boat and a securing means for the prow portion 11a of FIG. 1 when the boat is in transit.

The first apparent difference between the structure of FIGS. 1 and 2 is the presence of a brace 22 extending between the front brace 14 and the rear brace 13a in FIG. 2. This brace 22 is designed particularly for heavier boats. For boats weighing less than 200 pounds it is probably not required.

A second difference between the embodiment of FIG. 1 and FIG. 2 is that the cross brace 13a of FIG. 2 is a wooden board or equivalent shaped metal transverse member rather than the box like structure of FIG. 1. The transverse member of 13a may be a board and carry a locking clamp 23 which pivots downward to clear the upper surface of the board 13a and upward to engage the gunwale 18 of the boat. The one clamp 23 pivoted downward allows movement of the boat pivoting about the device 17 to the left side of the vehicle 10 in both mounting and dismounting.

Figure 2A:
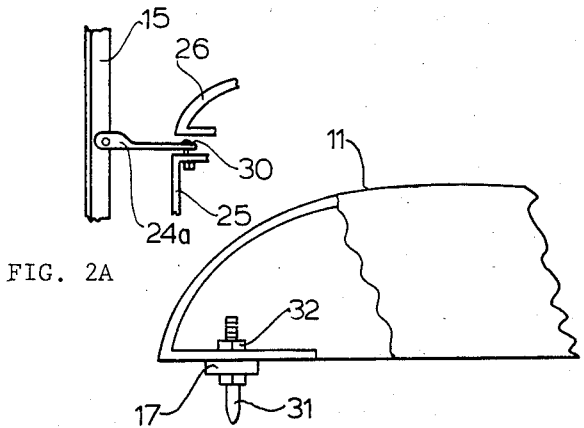
FIG. 2A is a fragmentary vertical sectional view of the grill brace of the embodiment of FIG. 2.

Referring now to FIG. 2A, more details of the front brace 24a may be seen. It is secured as by rivet to the "A" frame member 15 and by a bolt to the grill 25 inside of the hood 26.

Figures 3A, 3B:
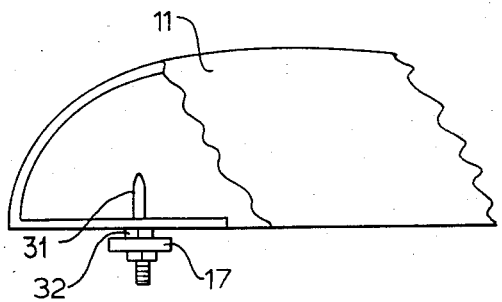
FIG. 3A is an enlarged vertical fragmentary sectional view of the bow region with the boat secured for transport.
FIG. 3B is an enlarged side elevational view of the bow support shown with a boat in place just after lifting and with the boat bow region shown in partial vertical section.

A key point of my invention is the fact that the front support 14 has sufficient strength to support the lighter end of the boat 11 while it is being mounted and unmounted from the vehicle as well as in transit. In order to mount and to remove the boat it is essential that the boat be pivoted from the side and downward to the ground in the process. This is accomplished through the use of a dual function device 31 as shown in FIGS. 3A and 3B. The device 31 includes, basically, a pin 31 mountable on plate 17 and of sufficient size to transfer the load of the boat prow 11a to the frame 14 without damage to either one. The plate 17 mounts the reversible pin or bolt 31 having at one end a tapered point and threads at the other end. The boat must be modified to the extent to have a hole or recess in its bow sufficient to receive the pointed or tapered end of the pin 31.

The pin 31, in the loading or unloading position, has its point upward allowing not only rotational movement of the boat but a degree of pivoting due to the tapering point. The pin 31 is free to wobble slightly as well during loading. After the boat is loaded in place the prow 11a may be lifted sufficiently to clear the pin 31 which may be lifted upward and reversed with the threaded section on top and the point extended downward as shown in FIG. 3A. The locking nut 32 may be installed within the prow 11a of the boat 11 holding it securely in place.

The relationship of the boat, its prow plate 37 and the boat 31 is best illustrated in FIG. 3C. Please note that with the nut 32 removed, pin 31 is free to wobble in the hole in plate 17. This wobbling effect allows the bolt 31 to receive the boat and engage the opening prow plate 37 and allows the boat to be lifted from the ground and raised while the prow is held by the wobbling pin 31. When the transom and rear region of the boat are firmly in place on the cross member 13 or 13a of FIGS. 1 and 2, the bolt 31 is stable and the boat owner may merely lift that prow portion 11a easily to remove, reverse and secure pin 31 to the prow 11a.

I have found that another type of more positive pivot particularly for heavier boats may be desired through the use of a cup member 40 at the upper end of the front support, 14 as illustrated in FIGS. 4A and 4A. A mating ball 41 similar to trailer hitch balls may be permanently secured by a nut 42 to the prow plate 37. The ball 41 rests in the cup 40 and provides an effective socket for pivoting movement of the boat 11 in the mounting and unmounting. There is no need to reverse any parts using the apparatus of FIGS. 4A and 4B. After the boat is in position for transportation, a single or double pin 43 is shown to hold the narrow neck region above the ball 41 and maintain the ball 41 in the cup 40 during transportation of the boat. It is possible to reverse the location of the cup 40 and ball 41 on the boat and frame without affecting their operation.

The details of one form of rear support described above in connection with FIG. 2 may be seen in greater detail in FIGS. 5A and 5B. The board or plate 13a is shown supported by vertical member 20 from the body 10a of the vehicle 10. "J" shaped latch 23 is pivoted upward to the position shown in dash lines in FIG. 5B to extend over and engage the gunwale 18 of the boat 11. A bolt and nut 28 inserted through opening in board 13a after the clamp 23 has been pivoted into place prevents its unwanted movement and secures the boat during transportation.

Referring now to FIG. 6A in conjunction with 6B, the larger cross support member 13 of FIG. 1 is now identified as an elongated box 50 having an end door 51 and suitable lock 52. The box 50 is long enough to provide secure transportation for assembled fishing rods and other longer equipment while the upper surface of the box 50 provides support for boat 11. In this case, the locking of the boat in place is accomplished by simply a carriage bolt 53 extending from the gunwale 18 through a hole in the upper surface box 50 and secured by a wing nut 54 within the box 50. The wing nut 54 may not be removed unless the door 51 is opened by the key 55. In this manner the boat owner may secure his boat and fishing gear with one single lock.

Figure 7A:
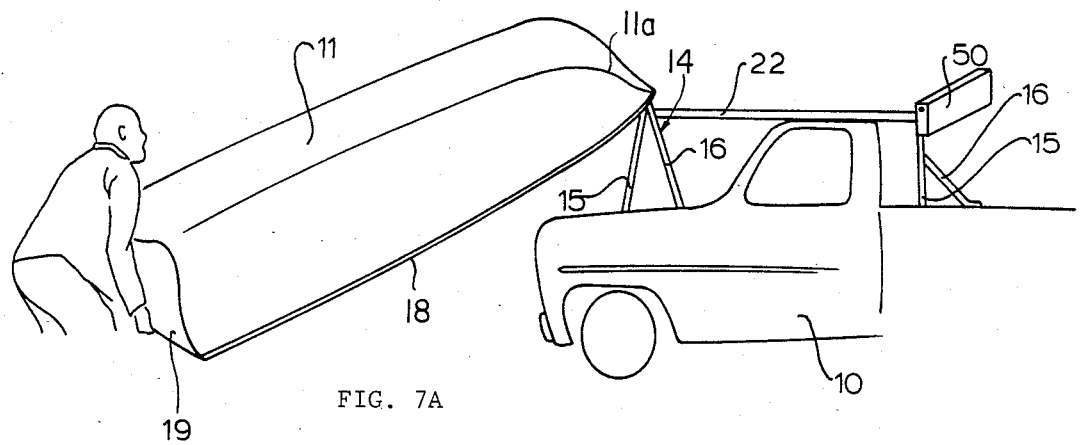
FIGS. 7A, 7B and 7C are a series of sequential drawings showing the loading of a boat on the carrier of this invention.
Figure 7B:
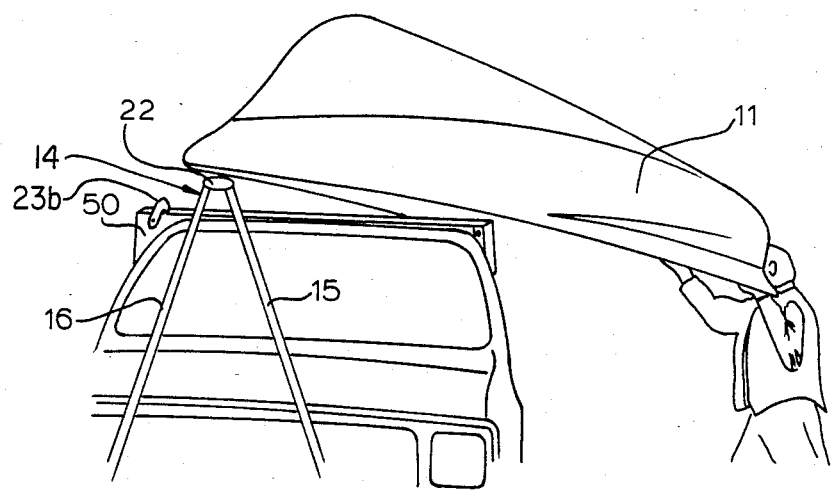
Figure 7C:
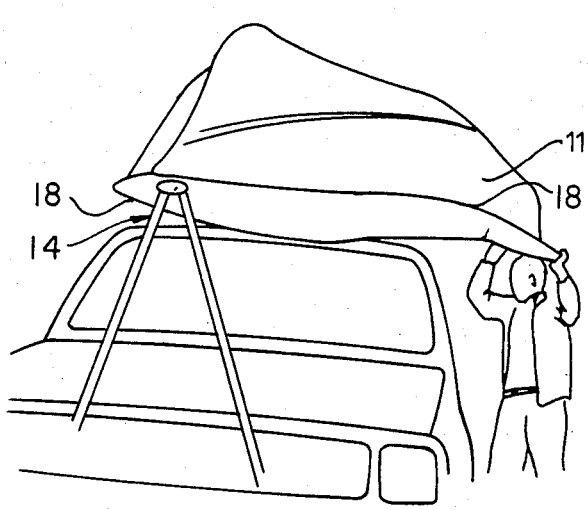

It is possible employing this invention for one person to load a relatively heavy boat, secure it for travel and unload it without any assistance and without danger or damage to the boat or injury to himself. This is accomplished by the following basic steps with the key steps illustrated in FIGS. 7A-7C.

1. The boat is inverted and placed with the bow relatively near the front of the vehicle and with the stern at approximately a forty-five degree angle with respect to the length of the vehicle.

2. The boat owner lifts the prow 11a of the boat and pivots the boat about the rear transom toward the "A" frame front support 14 until the prow 11a of the boat is positioned with either the hole or the tapered pin 31, or with the ball 41 of FIGS. 4A and 4B over the cup 40; then the prow is lowered until it is secured at the pivot point of the front support 14. At this time, the main weight is supported by the boat transom on the ground.

3. The boat owner then proceeds to the transom, lifting the boat by the transom or by handles which are often provided.

4. The boat owner lifts the transom high enough to clear the hood and the cab of the vehicle 10 by walking in a circular path towards the rear of the vehicle. The prow pivots on the front support 14.

5. As the boat owner approaches the rear of the vehicle he raises at least the near gunwale high enough to rest on the rear support 13 whereafter the boat is supported by the front support 14, the rear support 13 and partially by the owner.

6. The boat owner slides the boat across on support 13 until the opposite gunwale reaches the latch or locking device such as fixed clamp 23b of FIG. 7B. As such time the boat 11 now is aligned with the longitudinal axis of the vehicle and the near gunwale 18 is positioned for being secured by the near latch 23.

By securing the near latch 23 or its equivalent seen in FIGS. 6A and 6B, the boat is now ready for transportation after the front pivot member is secured either by reversal of the bolt 31 as described above or by inserting the locking pin 43 as described above in connection with FIGS. 4A and 4B.

Removal of the boat involves reversal of the foregoing steps and again may be accomplished by a single individual without assistance.

The above described embodiments are illustrative of the principles of this invention and are not to be considered limiting. Rather this invention is defined by the following claims including their equivalents.

I claim:

1. A vehicle top boat carrier comprising:
   a first support assembly adapted to be secured to the front of a vehicle including a single point support member having a pivotal securing means at a level corresponding approximately with the top of the vehicle;
   a pair of support members securable to the vehicle at a distance rear of the first support, extending upward to at least the level of the top of the vehicle and laterally spaced to engage and support the gunwales of a boat;
   whereby a pointed prow boat may be carried on said vehicle with the bow region secured to said front support at the pivotal attachment, and the gunwale portions providing three point support for the boat;
   wherein said pivotal securing means includes pivot means installable in an upward direction to provide pivoting of the boat thereabout during loading and unloading thereof and said securing means is reversible with the boat in place to provide a positive lock for the bow of the boat.

2. The combination in accordance with claim 1 wherein said pivotal securing means comprises an upward extending tapered pin when it is in the loading condition and reversible to provide and upward extending bolt.

3. A vehicle top boat carrier comprising:
   a first support assembly adapted to be secured to the front bumper region of a vehicle including a first rigid support member extending substantially vertically and free of overhang of the vehicle hood region and having an upwardly extending pivotal sibgle point securing means into which the prow of a boat may be lowered at a level corresponding approximately with the top of the vehicle and without the boat overhanging substantially any portion of the vehicle when the boat extends in front of the vehicle;
   a second support member securable to the vehicle at a distance rear of the first support member, and laterally extending to engage and support the gunwales of a boat when a boat is positioned with its prow on the said uupwardly extending single point pivotal securing means of said first support assembly;
   whereby a pointed prow boat may be loaded on said vehicle by lifting the bow of the boat and lowering the bow onto said upward extending single point pivotal securing means, pivoted, and the stern of the boat lifted to rest on said second support member and said boat may be carried on said vehicle with said bow region secured to said first support assembly at said upwardly extending single point pivotal securing means, and the gunwale portions by said second laterally extending support member thereby providing three point support for the boat;
   including securing means at said first support assembly convertible from a pivotal support device to a securing device;
   wherein such securing means comprises a socket for receiving a ball and locking means adapted to receive said ball.

4. The combination in accordance with claim 3 wherein said locking means comprises a pin extending through the wall of said socket to hold said ball within said socket.

5. A vehicle top boat carrier comprising:
   a first support assembly adapted to be secured to the front bumper region of a vehicle including a first rigid support member extending substantially vertically and free of overhang of the vehicle hood region and having an upwardly extending pivotal single point securing means into which the prow of a boat may be lowered at a level corresponding approximately with the top of the vehicle and without the boat overhanging substantially any portion of the vehicle when the boat extends in front of the vehicle;
   a second support member securable to the vehicle at a distance rear of the first support member, and laterally extending to engage and support the gunwales of a boat when a boat is positioned with its prow on the said upwardly extending single point pivotal securing means of said first support assembly;

whereby a pointed prow boat may be loaded on said vehicle by lifting the bow of the boat and lowering the bow onto said upward extending single point pivotal securing means, pivoted and the stern of the boat lifted to rest on said second support member and said boat may be carried on said vehicle with said bow region secured to said first support assembly at said upwardly extending single point pivotal securing means, and the gunwale portions by said second laterally extending support member thereby providing three point support for the boat;

wherein said cross member comprises an elongated box extending transverse to the length of said vehicle;

said box including an access door for the interior of said box means for securing a boat to said box from the interior thereof.

6. The combination in accordance with claim 5 wherein said securing means comprises a bolt releasable only from the interior of said box.

* * * * *